(No Model.)

C. G. CALO.
COMBINED BREAST COLLAR AND SADDLE.

No. 339,372. Patented Apr. 6, 1886.

WITNESSES:

INVENTOR:
C. G. Calo
BY Munn & Co
ATTORNEYS.

UNITED STATES PATENT OFFICE.

CHRISTOPHER G. CALO, OF NEW YORK, N. Y., ASSIGNOR TO THE BRADLEY, VOORHEES & DAY MANUFACTURING COMPANY, OF SAME PLACE.

COMBINED BREAST-COLLAR AND SADDLE.

SPECIFICATION forming part of Letters Patent No. 339,372, dated April 6, 1886.

Application filed July 16, 1885. Serial No. 171,825. (No model.)

*To all whom it may concern:*

Be it known that I, CHRISTOPHER G. CALO, of the city, county, and State of New York, have invented certain new and useful Improvements in Combined Breast-Collars and Saddles, of which the following is a full, clear, and exact description.

Reference is to be had to the accompanying drawings, forming a part of this specification, in which similar letters of reference indicate corresponding parts in all the figures.

Figure 1:
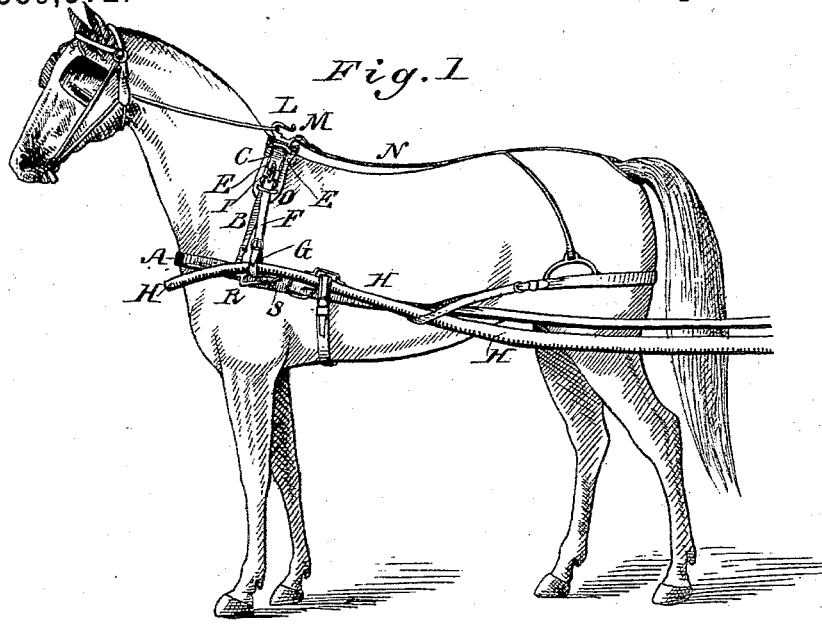
Figure 2:
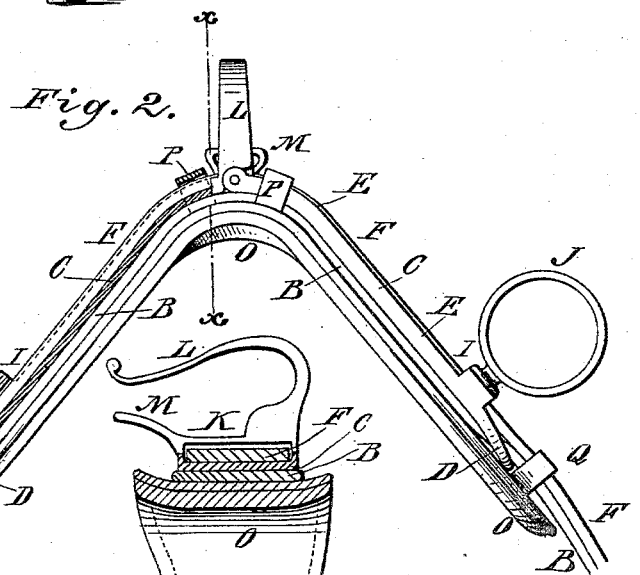
Figure 3:
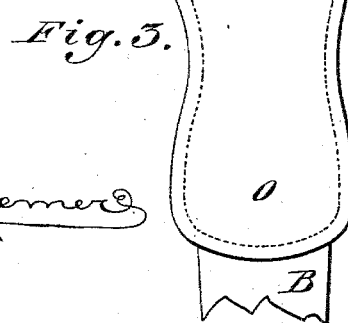

Figure 1 is a side elevation of my improvement shown as applied to a horse. Fig. 2 is a front elevation of the upper part of the neck-strap of the breast-collar and its appliances, the saddle being shown partly in section. Fig. 3 is a sectional side elevation of the same, taken through the line $x$ $x$, Fig. 2.

The object of this invention is to provide combined breast-collars and saddles, whereby the use of the ordinary back-saddles is avoided, and the harness is made lighter and less expensive in manufacture.

The invention consists in the combination of a saddle with the neck-strap of a breast-collar.

The saddle-tree is made with end loops to receive the top strap, with upwardly-projecting flanges to keep the top strap in place, and with loops for the passage of the top strap, and to receive the terrets and the check-hook and a loop to receive the top strap.

The saddle-tree is made with one or more hinges at its central part, to adapt the saddle to fit upon horses' necks of different sizes and shapes, as will be hereinafter fully described and then claimed.

A represents the breast-strap, and B the neck-strap, of a breast-collar.

C is the saddle-tree, which rests upon the middle part of the neck-strap B, and has loops D formed in its ends, through which the said neck-strap B is passed, as shown in Fig. 2. The front and rear edges of the saddle-tree C have upwardly-projecting flanges E formed upon them, to form a seat for the top strap, F, to the ends of which are buckled loops G, to receive the thills H when the harness is used as a single harness, and with which is connected the neck-yoke when the harness is used as a double harness.

Upon the end parts of the saddle-tree C are formed loops I, to serve as keepers for the strap F, and into which the rein-terrets J are screwed, or to which the said terrets are otherwise secured.

Upon the middle part of the saddle C is formed a loop, K, to serve as a keeper for the strap F, and into which the check-hook L is screwed, or to which the said check-hook is otherwise secured.

Upon the rear end of the loop K is formed a loop, M, to receive the back-strap N.

The saddle-tree C is made with one or more hinges at its central part, as shown in Fig. 2, to cause the saddle to adjust itself to horses' necks of different shapes and sizes, so that the said saddle will fit easily upon and will not chafe the said necks.

The saddle is provided with a neck-pad, O, which is secured in place by loops P, passing around the saddle C, and the straps B F at the opposite sides of the check-hook L, and by loops Q, passing around the straps B F at or near the ends of the saddle-tree C. With this construction the weight of the thills will be supported by the horse's neck, giving the horse a better control of the said thills in guiding the vehicle, and producing a harness less expensive in manufacture, while being equally effective in use.

To the under sides of the thills H are attached the base-plates of hooks R, to receive the thill-loops G. The hooks R are secured to the thills H with their ends to the rearward, and in recesses in the upper sides of the rear ends of their base-plates are hinged links S, the lower ends of which rest upon the said hooks R near their ends. With this construction the links S will not interfere with the entrance of the thill-loops G into the hooks R, but will prevent the said loops from coming out of the said hooks accidentally, or without the said links being first raised away from the said hooks.

Having thus described my invention, I claim as new and desire to secure by Letters Patent—

1. As an improved article of manufacture, a combined neck-strap and saddle for breast-strap harness, consisting of the saddle E, having a loop, K, a check-hook, terrets, and end loops, D, the neck-strap B on the under side of the saddle, passed through loops D, and constructed to be attached at its ends to a breast-strap, the pad O below the neck-strap B, and having loops embracing the said neck-strap and saddle, and the thill-supporting strap F, passed through the loops of the saddle and pad, and having its ends constructed to be connected with the vehicle-thills, substantially as set forth.

2. The neck-saddle E, hinged as described, and provided with the loop K above the hinged connection, the check-hook L over the loop K, the intermediate loops, I, and the end loops, D, substantially as set forth.

3. A combined neck-strap and saddle for breast-strap harness, comprising the hinged saddle E, having the check-hook, terrets, loops I, and end loops, D, the pad O beneath the saddle and having top loops, P, embracing the saddle at opposite sides of the hinge, and loops Q at its ends, the neck-strap B, held between the pad and saddle, and having its end parts passed outward through the saddle-loops D and through the pad-loops Q, the thill-supporting strap F on top of the saddle, passing through the upper pad-loops, then through the saddle-loops I, and down through the lower pad-loops, Q, over neck-strap B, substantially as set forth.

4. The combination, with the neck-strap of the breast-collar, of the saddle-tree having side flanges to receive and retain in place the thill-supporting strap, and the neck-pad having loops passing around the saddle-tree and the neck and thill-supporting straps, substantially as and for the purpose set forth.

CHRISTOPHER G. CALO.

Witnesses:
JAMES T. GRAHAM,
C. SEDGWICK.